Sept. 16, 1969 M. SCHULMAN 3,466,932

ACCELERATION CONTROL PLATFORM

Filed Sept. 15, 1967

INVENTOR.
MARVIN SCHULMAN

BY

ATTORNEY

United States Patent Office 3,466,932 Patented Sept. 16, 1969

3,466,932
ACCELERATION CONTROL PLATFORM

Marvin Schulman, Broomall, Pa., assignor to the United States of America as represented by the Secretary of the Navy Filed Sept. 15, 1967, Ser. No. 668,240
Int. Cl. G01n *33/00*
U.S. Cl. 73—432 8 Claims

ABSTRACT OF THE DISCLOSURE

The subject invention concerns apparatus for achieving a constant acceleration for test specimens when the acceleration of the test-vehicle used varies in magnitude. A control platform, on which the specimen is mounted, is slidably carried by guide elements secured to the top of the test-vehicle used. Energy absorbers, which begin stroking when a predetermined acceleration is reached, are connected between the control platform and the test-vehicle to allow the control platform to move relative to the test-vehicle and thereby maintain a constant acceleration thereon.

The present invention relates particularly to control apparatus for changing the waveshape or pattern of an acceleration pulse from a varying magnitude to a constant acceleration.

In the past, the research projects conducted to analyze the effects that high acceleration forces have on specimens, machinery, humans, etc., have been hampered because of the difficulty in designing simple and accurate test equipment which produce a constant acceleration. All accelerators use a means for generating a force on a platform or sled. For example, a horizontal linear catapult uses a ram which is pushed out of the catapult housing by pneumatic pressure and in turn pushes a sled. Other accelerators use rocket power, propellant actuated devices, gravity and hydraulics to accelerate or decelerate the sled holding the test specimen.

In almost all testing procedures it would be of value to produce a constant acceleration of varying magnitude, but the personnel performing the tests are forced to accept irregular acceleration or deceleration waveshapes because of the inherent physical difficulties present in generating square waves. For example, the horizontal linear catapult previously mentioned was designed to produce acceleration pulses approximating a square wave and incorporates complex machinery and valves to accomplish this task. Because of hydraulic back pressures, inertia and valve opening time delays, an irregular pulse shape is generated which, for purposes of data analysis, is difficult to use as a means for evaluating research projects.

It is therefore a principal object of the present invention to provide a novel and improved acceleration control platform whereby a constant acceleration may be maintained throughout a period of testing.

It is another object of the present invention to provide a novel and improved acceleration control platform which is relatively simple in construction and operation and yet highly accurate and reliable in use.

It is a further object of the present invention to provide a novel and improved acceleration control platform for redistributing the available surplus energy so that a constant acceleration may be achieved.

Figure 1:
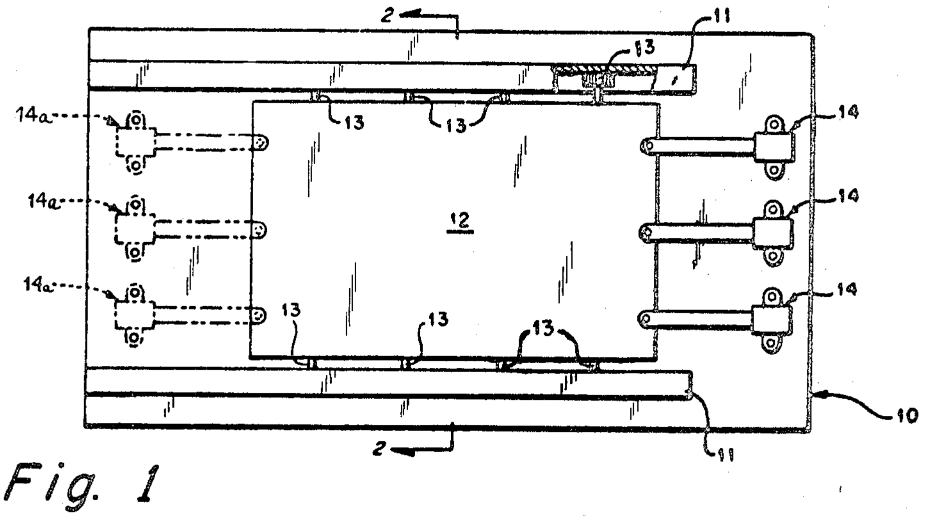
Figure 2:
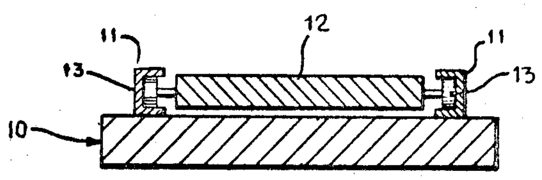
Figure 3:
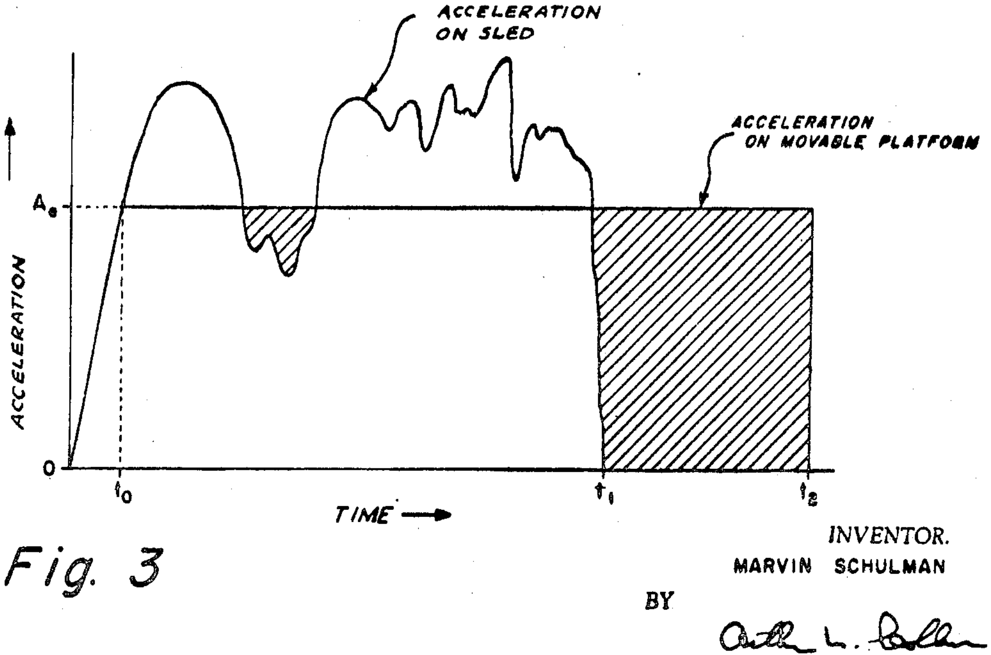

Other objects and many of the attendant advantages of this invention will be readily appreciated as the same becomes better understood by reference to the following detailed description when considered in connection with the accompanying drawing wherein:

FIGURE 1 of the drawing is a top plan view of a preferred embodiment of the invention;

FIGURE 2 of the drawing is a sectional view taken substantially on line 2—2 of FIG. 1, looking in the direction of the arrows; and FIGURE 3 of the drawing is a graph indicating a typical pattern redistribution that can be accomplished with the preferred embodiment of the invention shown in FIGS. 1 and 2.

Referring now to the details of FIGS. 1 and 2 of the drawing, wherein like reference numerals apply to like parts throughout, 10 designates a platform-vehicle or sled capable of being propelled at a positive rate of acceleration. The means for accelerating the sled 10 have not been shown and may be any suitable conventional means which can produce acceleration pulses which approximate a square wave.

A pair of spaced apart, parallel guide elements 11 are secured to the top of the sled 10 in any preferred manner. The guide elements 11 are preferably U-shaped channels and extend substantially the entire length of the sled 10 parallel to the direction of acceleration thereon. There is provided a control platform 12 that is slidably carried by the guide elements 11. A plurality of roller wheels 13 are attached in any suitable manner along both sides of the control platform 12 and are carried within the guide elements 11 to allow the control platform to move relative to the direction which the sled 10 is being accelerated. The roller wheels 13 may be suitably replaced by any other arrangement which will allow the control platform 12 to slide freely within the guide elements 11, and are merely shown as a preferred example.

The movement of the platform 12 is controlled by attaching one end of an energy absorber device 14 to the forward end of platform 12 and the other end of the energy absorber 14 to the forward end of the sled 10. Three such energy absorbers 14 are shown in FIG. 1 and are constant load stroking devices which can be designed to work in either tension or compression. The three energy absorbers 14 shown in the drawing are designed to operate in tension, in a manner in which will become more apparent hereinafter. Shown in phantom lines in FIG. 1 are three energy absorbers 14*a* which are attached to the rear of the control platform 12 and the sled 10 respectively. The energy absorbers 14*a* are designed to work in compression and can replace the energy absorbers 14 to accomplish the same desired results.

An energy absorber such as that manufactured by Van Zelm, Incorporated may be used, for example, to operate in tension. A strap is pulled through a metal bender whenever the load applied to the strap exceeds the predetermined working condition design level. The stroking or pulling of the strap allows the control platform 12 to move relative to the sled 10 whereby the acceleration of the platform 12 is kept constant, in a manner which will be more apparent hereinafter. The strap will continue to be pulled through the metal bender until its entire length or any part is used up, depending on the particular application for which the control platform is used.

The Van Zelm energy absorber is only one of many different types of constant load energy devices which may be used with equal success. For example, aluminum honeycomb may be used as an energy absorber that works in compression, and would be attached as shown at 14*a*. Dies in tubes, flangilated tubes and energy absorbers using the torous principle also may be used. Choice of the energy absorber to be used and its placement on the proper end of the control platform 12 is dependent on whether the absorber works in tension or compression and whether an acceleration or deceleration force is applied to the platform-vehicle or sled 10.

In operation, the object or specimen whose tolerance to force is to be measured is mounted on the control platform 12. The energy absorber or absorbers 14 (or 14*a*) are fastened to one end of the movable control platform. The constant acceleration or G-level that will be obtained on the control platform 12 is a function of the total load required to start the energy absorber or absorbers stroking, divided by the total weight of the control platform including the test specimen mounted on it. The only requirement is that the sled 10 must be accelerated or decelerated to a higher G-level than the computed level of the control platform 12.

An example of a typical calculation is as follows: If the control platform and test specimen weigh 500 lbs. and each energy absorber is designed to begin stroking at 2500 lbs., it will be necessary to attach three energy absorbers 14 will start stroking at a constant rate produce a constant acceleration of 15G's on the test specimen. It will also be necessary to accelerate the sled 10 to a higher level than 15G's. It will be noted that if an energy absorber designed to begin stroking at 7500 lbs. is used, only one will be necessary to produce a constant acceleration force of 15G's.

When the sled 10 is accelerated and the acceleration-mass load of the movable control platform 12 reaches the predetermined level, then the energy absorber or absorbers 14 will start stroking at a constant rate providing a constant acceleration on the control platform 12.

Referring now to FIG. 3 of the drawing, a typical pattern redistribution is shown which can be accomplished with the present preferred embodiment of the invention. The control platform 12 will begin displacing relative to the direction of motion of the top of the sled or platform-vehicle 10 at time to when A*e*, the acceleration at the computed available energy, is reached. It is necessary that there be a definite motion between the control platform and the top of the sled in order to redistribute the energy supplied by the driving force so that the acceleration is kept constant for a prolonged time period. The control platform 12 starts moving at to because the acceleration of the platform times its mass equals the load necessary to cause the energy absorber or absorbers to begin stroking. All the area bounded by the sled acceleration curve above the constant acceleration line A*e* will be redistributed to fill up the shaded areas, which are caused by a decrease in the sled acceleration below A*e*, and will produce the constant acceleration pulse extending to $t_2$.

Obviously, many modifications and variations of the present invention are possible in the light of the above teachings. It is therefore to be understood that, within the scope of the appended claims, the invention may be practiced otherwise than as specifically described.

What is claimed is:

1. Constant acceleration apparatus comprising:
(a) a platform-vehicle capable of being propelled at a positive rate of acceleration;
(b) a pair of spaced guide elements secured to the top of the platform-vehicle parallel to the direction of acceleration;
(c) a control platform slidably carried by the guide elements; and
(d) constant load stroking means attached between the platform-vehicle and the control platform whereby said load means will begin stroking when a predetermined level of acceleration is reached so that the control platform is displaced relative to the platform-vehicle thereby maintaining the control platform at a constant acceleration.

2. The constant acceleration apparatus as substantially described in claim 1, wherein said guide elements are U-shaped channels, and wherein a plurality of roller wheels are attached along both sides of the control platform to fit within the U-shaped channels so that the control platform is free to move relative to the platform-vehicle.

3. The constant acceleration apparatus as substantially described in claim 1, wherein said constant load stroking means are energy absorbers which continue to stroke until the forces acting on them are reduced below their working condition design level.

4. The constant acceleration apparatus as substantially described in claim 1, wherein said constant load stroking means are attached between the forward ends of the platform-vehicle and the control platform respectively, whereby said load means work in tension to produce a constant acceleration.

5. The constant acceleration apparatus as substantially described in claim 1, wherein said constant load stroking means are attached between the rearward ends of the platform-vehicle and the control platform respectively, whereby said load means work in compression to produce a constant acceleration.

6. In apparatus for providing a constant acceleration:
(a) a sled capable of being propelled at a positive rate of acceleration;
(b) a pair of substantially parallel U-shaped guide elements secured to the top of the sled parallel to the direction of acceleration;
(c) a control platform for mounting a test specimen thereon;
(d) roller elements mounted along the sides of the control platform to fit within the U-shaped guide elements, whereby said control platform is free to move in the U-shaped guide elements relative to the sled; and
(e) constant load energy absorber means connected between the sled and the control platform whereby said energy absorber means will begin to stroke when a predetermined rate of sled acceleration is reached and thereby maintain the control platform at a constant rate of acceleration.

7. The apparatus as substantially described in claim 6, wherein said energy absorber means are connected between the forward ends of the sled and the control platform respectively, whereby said energy absorber means work in tension to produce a constant acceleration.

8. The apparatus as substantially described in claim 6, wherein said energy absorber means are connected between the rearward ends of the sled and the control platform respectively, whereby said energy absorber means work in compression to produce a constant acceleration.

References Cited

UNITED STATES PATENTS

| | | | |
|---|---|---|---|
| 2,909,129 | 10/1959 | Nichols et al. | 104—134 |
| 2,959,446 | 10/1960 | Thompson | 296—65 |
| 3,339,418 | 9/1967 | Paynter et al. | 73—432 |

S. CLEMENT SWISHER, Primary Examiner